Sept. 16, 1924.
W. H. JOHNSON
LEER FEEDER
Filed Jan. 25, 1923
1,509,064
3 Sheets-Sheet 1
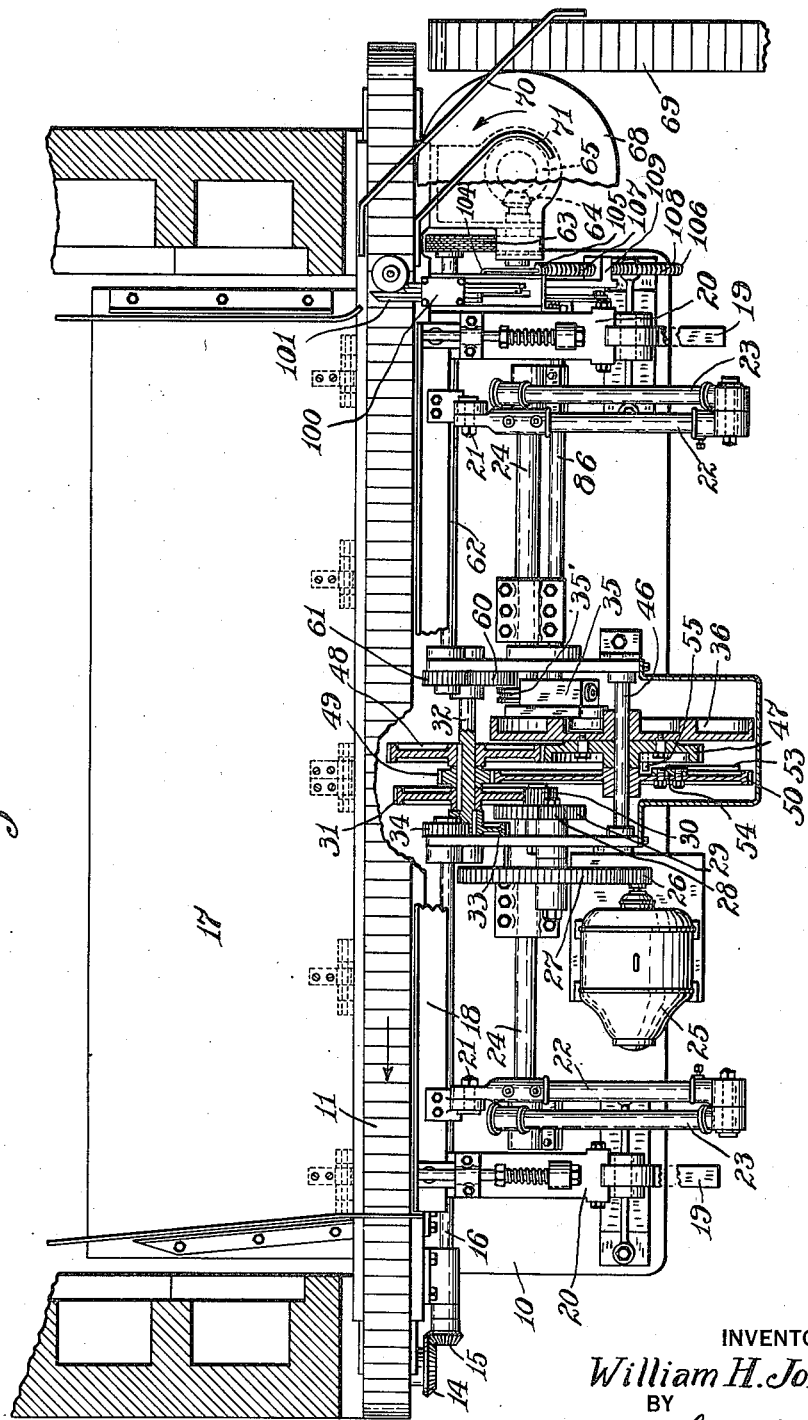
INVENTOR
William H. Johnson,
BY
Arthur M. Hood.
ATTORNEY Sept. 16, 1924.
W. H. JOHNSON
LEER FEEDER
Filed Jan. 25, 1923
1,509,064
3 Sheets-Sheet 2
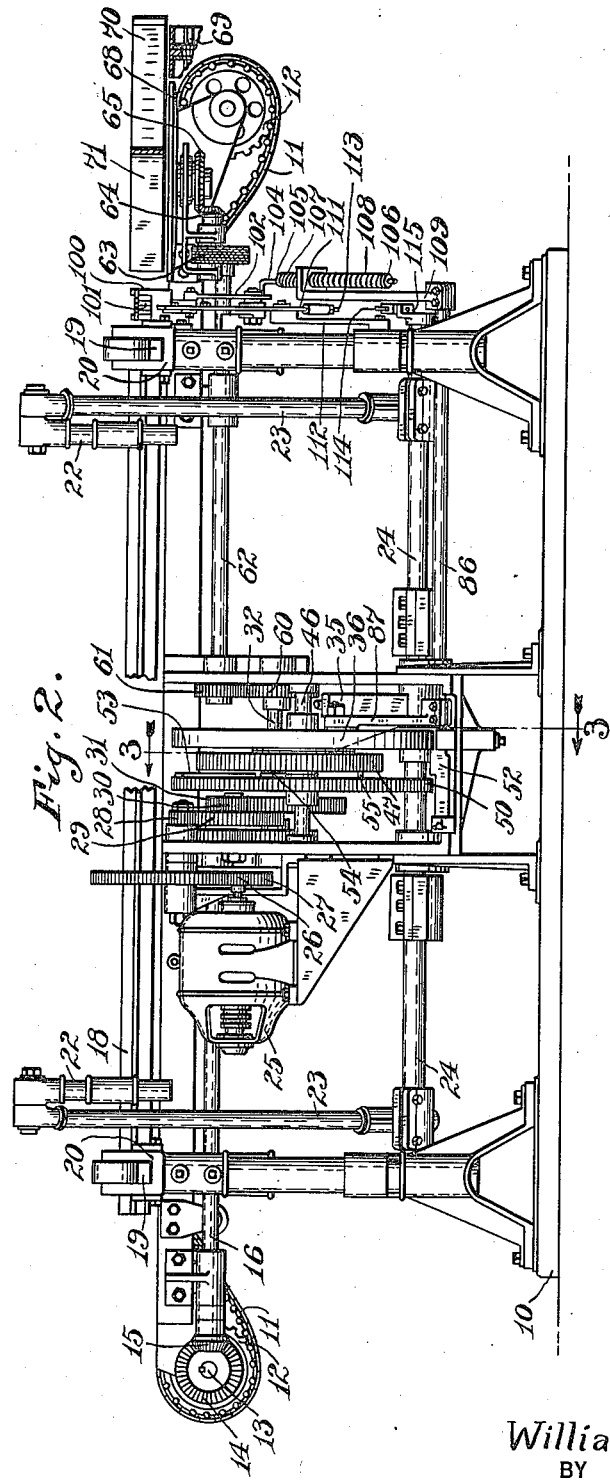
INVENTOR
William H. Johnson,
BY
Arthur M. Hood.
ATTORNEY Sept. 16, 1924.
W. H. JOHNSON
LEER FEEDER
Filed Jan. 25, 1923   3 Sheets-Sheet 3
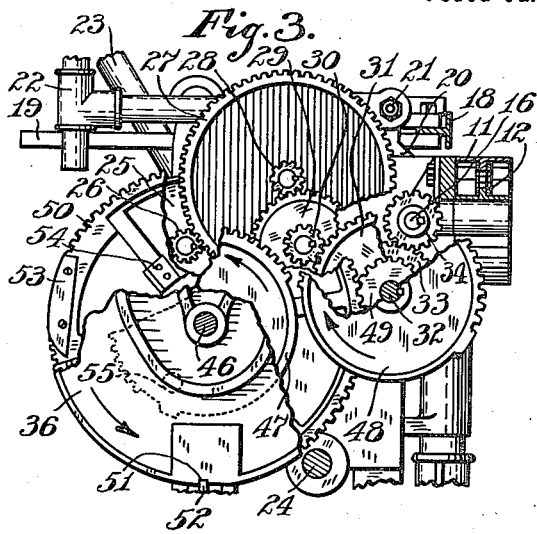
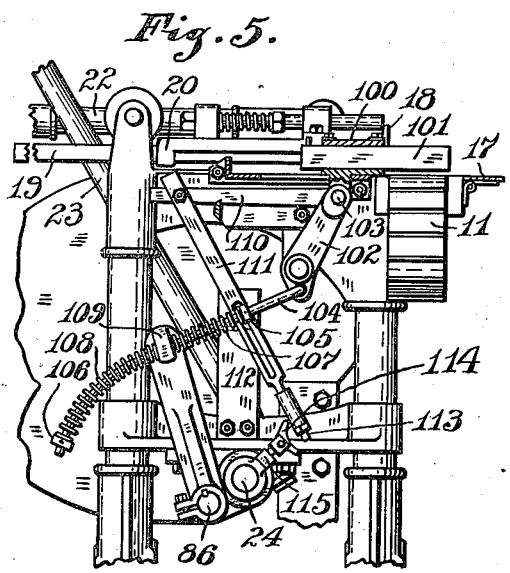
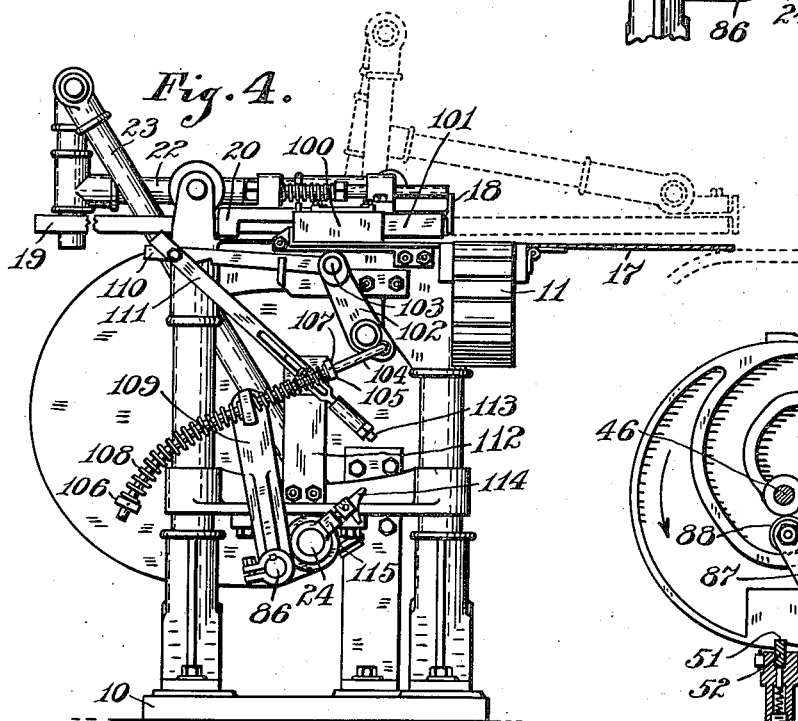
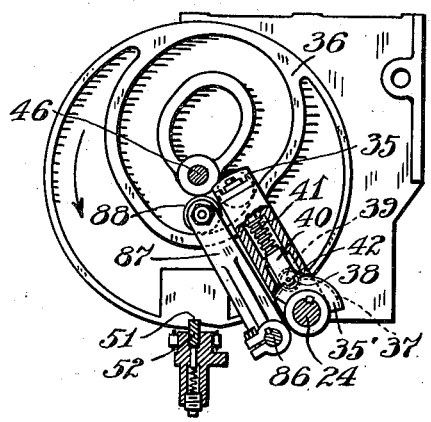
INVENTOR
*William H. Johnson,*
BY
*Arthur M. Hood.*
ATTORNEY Patented Sept. 16, 1924.

1,509,064

UNITED STATES PATENT OFFICE.

WILLIAM H. JOHNSON, OF TERRE HAUTE, INDIANA, ASSIGNOR TO AUTOMATIC MACHINERY COMPANY, OF TERRE HAUTE, INDIANA, A CORPORATION OF INDIANA.

LEER FEEDER.

Application filed January 25, 1923. Serial No. 615,425.

*To all whom it may concern:*

Be it known that I, WILLIAM H. JOHNSON, a citizen of the United States, residing at Terre Haute, in the county of Vigo and State of Indiana, have invented a new and useful Leer Feeder, of which the following is a specification.

The object of my invention is to produce a compact and efficient leer feeder by means of which a stream of freshly formed glass articles may be automatically delivered into a leer. While the apparatus is primarily designed for the purpose above specified, it will be understood, of course, that it may be used for similarly handling other articles.

The accompanying drawings illustrate my invention; Fig. 1 is a plan in partial horizontal section of the improved apparatus; Fig. 2, a front elevation; Fig. 3, a detail in partial vertical section on line 3—3 of Fig. 2; Fig. 4, an end elevation; Fig. 5, a fragmentary end elevation, in partial vertical section; and Fig. 6, a detail of the primary cam and associated parts.

In the drawings, 10 indicates a suitable supporting frame, upon which is supported, upon suitable ways, an endless conveyor belt 11 having an upper carrying surface of such character as to properly support the freshly formed hot glass ware and to slip beneath the same if the flow of ware is interrupted. Belt 11 is supported by suitable sprocket wheels 12, 12, one of which is provided with a shaft 13 having a bevelled gear 14 which meshes with a driving pinion 15 carried by shaft 16.

Along one side, belt 11 is flanked by a bridge plate 17.

Arranged along the other side of belt 11 is a push bar 18 carried at the forward ends by a pair of slides 19, 19 slidably mounted in suitable ways 20 on frame 10.

Pivoted at 21, 21 to push bar 18 are pitmen 22, 22 which are pivoted to the outer end of arms 23, 23 carried by a rock shaft 24.

The motor 25 has its pinion 26 meshing with the gear 27 which, through a train of reducing gears 28, 29, 30 and 31, continuously rotates countershaft 32 which carries a gear 33 meshing with a gear 34 on shaft 16, so that the conveyor 11 is continuously driven in the direction indicated by the arrow in Fig. 1.

Rock shaft 24 is reciprocated by means of an arm 35 and cam 36. The arm 35 is yieldingly locked to shaft 24 by means of the construction illustrated in Fig. 6.

The arm 35 is arranged along side of a metal flange 35' carried by shaft 24, said flange being provided with a circumferential groove 37 (dotted lines Fig. 6), and a transverse notch 38. Normally seated in the transverse notch 38 is a roller 39 carried by plunger 40 mounted in arm 35 and backed by spring 41. The roller 39 is provided with a circumferential rib 42 which is capable of seating in the groove 37 in flange 35' so as to keep the parts in registry.

The above described arrangement is to permit movement of rock shaft 24 in case the push bar 18 is obstructed in its forward motion.

Cam 36 rotates upon a fixed shaft 46 and carries a mutilated gear 47 which is aligned with a mutilated gear 48 keyed to shaft 32. Gear 49, keyed to shaft 32, meshes with a timing gear 50 which rotates freely on shaft 46 along side of the mutilated gear 47.

Cam 36 is provided with a locking notch 51 so located as to place cam 36 in position to normally hold the push bar 18, in the position shown in Fig. 1 and said notch is formed to receive a spring catch 52 mounted in frame 10, said catch being intermittently withdrawn from the notch by means of a cam 53 carried by the timing gear 50, said cam 53 retracting the catch just as a block 54, carried by the timing gear 50, comes into contact with a pin 55 carried by gear 47, the arrangement being such that gear 47 is advanced, from its normal, at rest, position at a proper time, during one of the rotations of shaft 32, to be engaged by the forward end of the mutilated tooth series on gear 48.

The gears are so proportioned that the push bar 18 will be moved quickly transversely of the carrier 11 and quickly returned to initial position, at desired intervals, the period of these intervals depending upon the character of the ware which is to be handled.

Shaft 32 carries a gear 60 meshing with a gear 61 on shaft 62, similar to shaft 16, and connected, by sprocket chain connections 63 and bevel gear 64 and bevel gear 65 with a horizontally rotatable transfer disk 68 which is arranged in the corner between the receiving end of conveyor 11 and the delivery end of a similar conveyor 69, guiding fences 70 and 71 being arranged over the conveyors and disk in the usual manner.

During the period when the push bar 18 is moving laterally across conveyor 11 and returning to its initial position, the flow of ware along the conveyor in front of the push bar must be interrupted, and this interruption is obtained by the intermittent projection of stop finger mechanism across the initial end of conveyor 11 just in advance of the push bar.

A reciprocating carrier 100 carries a plurality of independently movable stop fingers 101 of the character disclosed in the Purcell Patent No. 1,431,895, and is here illustrated merely as a satisfactory form of dam or stop finger capable of arresting movement of articles along with belt 11.

Carrier 100 is reciprocated by means of a lever 102 connected by pin and slot connection 103 with the carrier and shifted through the medium of a pitman 104 provided with a pair of abutments 105 and 106 for a pair of balanced springs 107 and 108, an arm 109 carried by rock shaft 86, lying between the two springs. The rock shaft 86 is provided with an arm 87 carrying a roller 88 taking into the same groove of the cam 36 which operates arm 35. When arm 109 is moved to the left, from the position shown in Fig. 4, it serves to project fingers 101 across the face of belt 11 and bring the catch 110 to locking position, shown in Fig. 5, thereby holding carrier 100 and the stop finger 101 in the position shown in Fig. 5 during a period of return of shaft 86 and arm 109, this period of return serving to compress spring 107. The movement of catch 110 to the position shown in Fig. 5 shifts the releasing link 111 to the position shown in Fig. 5. This releasing link is pivotally connected at its upper end to catch 110 and has a pin and slot support 112 on the main frame. Its lower end is provided with an adjustable foot 113 adapted to be engaged, upon the counter-clockwise movement of the shaft 24, by a pawl 114 pivotally supported upon an arm 115 carried by the shaft 24, the arrangement being such that, as shaft 24 returns to its normal, at rest, position, shown in Fig. 5, the pawl 114 will be brought up against foot 113, so as to raise catch 110 from engagement with the frame, and permit spring 107 to suddenly retract the stop finger from above belt 11 and thus permit flow of articles along this belt to be resumed as soon as the push bar 18 has been returned to its normal, at rest, position by the action of cam 36.

The operation is as follows:

Ware arriving on conveyor 69 will be transferred therefrom to conveyor 11 by the combined action of the conveyors, fences 70 and 71 and disk 68, and this flow will continue until the desired quantity of ware has arrived upon belt 11 in front of push bar 18, whereupon latch 52 will have been withdrawn and block 54, acting upon pin 55, will bring gear 47 into mesh with gear 48. The first action of cam 36 will be to swing arm 87 to the left (Fig. 6), thus swinging arm 109 to the left (Fig. 5) so as to suddenly project fingers 101 across carrier 11 to form a dam for the oncoming ware, this action taking place promptly and without any substantial compression of spring 108 but, when the carrier 100 reaches the limit of its projected movement, spring 108 will be compressed by the continued movement of arm 109, this provision being necessary because cam 36 must be of sufficient throw to produce the necessary throw of the push bar. When carrier 100 is fully projected, catch 110 will engage a portion of the frame, as shown in Fig. 5, and rod 111 will be projected to the position shown in Fig. 5. Immediately following the initial movement of arm 87 and shaft 86, cam 36 acts upon arm 35 to rock shaft 24 in a clockwise direction so as to project the push bar across the belt 11 over bridge plate 17 and to promptly return the push bar to initial position. As rock shaft 24 passes in a clockwise direction, trigger 114 will pass freely under the lower end of rod 111 and, at the initial portion of the return movement of shaft 24, this trigger 114 will come up against foot 113 so as to raise catch 110 and thus release carrier 100 so that spring 107, which has been sufficiently compressed by the return movement of arm 109, will serve to retract the stop fingers 101 from their damming position over the carrier 11.

The claims of the present application are drawn to one form of my invention disclosed in my co-pending application Serial No. 615,423, filed January 25, 1923, in which application generic claims are made.

I claim as my invention:

1. In a leer feeder, a carrier for bringing ware to the mouth of a leer, a push bar arranged along side the carrier, a rock shaft, an operating arm mounted on said shaft and operated by said cam, a second operating arm mounted on said shaft and arranged to intermittently sweep the push bar laterally across the carrier and return, a second rock shaft, an arm mounted on said second shaft arranged to be operated by said cam, a second rock arm mounted on said second shaft, a stop finger arranged to be moved into and out of the flow line of the ware, and means interposed between the rock arm on said second rock shaft and said stop finger for operating the same.

2. In a leer feeder, a carrier for bringing ware to the mouth of a leer, a push bar arranged alongside the carrier, means for intermittently sweeping the push bar laterally across the carrier and return, a stop finger arranged to be shifted out of the flow line of ware, catch mechanism for retaining said finger in flow-restraining position, means for shifting said stop finger comprising a spring placed in commission during the period when the catch is preventing retraction of the stop finger, and means for releasing said catch.

3. In a leer feeder, a carrier for bringing ware to the mouth of a leer, a push bar arranged alongside the carrier, a rock-shaft, connections between the rock-shaft and push bar by which the push bar may be swept laterally across the carrier, a cam acting on said rock-shaft, a stop finger movable into and out of the line of flow of ware to a position in front of the push bar, a second rock-shaft and connections between the same and the stop finger, and connections between said second rock-shaft and the cam.

4. In a leer feeder, a carrier for bringing ware to the mouth of a leer, a push bar arranged alongside the carrier, a rock-shaft, connections between the rock-shaft and push bar by which the push bar may be swept laterally across the carrier, a cam acting on said rock-shaft, a stop finger movable into and out of the line of flow of ware to a position in front of the push bar, a second rock-shaft, connections between said second rock shaft and the cam, an arm carried by the second rock-shaft, a pitman associated with said arm, a pair of oppositely acting springs arranged between said pitman and arm, connections between the pitman and stop finger, a catch serving to retain the stop finger in flow-blocking position against the action of one of said springs, and means controlled by the first rock-shaft for releasing said catch.

5. In a leer feeder, a carrier for bringing ware to the mouth of a leer, a push bar arranged alongside the carrier, a rock-shaft, connections between the rock-shaft and push bar by which the push bar may be swept laterally across the carrier, a cam acting on said rock-shaft, a stop finger movable into and out of the line of flow of ware to a position in front of the push bar, a second rock-shaft, connections between said second rock-shaft and the cam, an arm carried by the second rock-shaft, a pitman associated with said arm, a pair of oppositely acting springs arranged between said pitman and arm, connections between the pitman and stop finger, a catch carried by the stop finger and serving to retain the stop finger in flow-blocking position against the action of one of said springs, tripping means controlled by the first rock-shaft, and means acted upon by said tripping means for releasing said catch.

In witness whereof, I have hereunto set my hand at Terre Haute, Indiana, this 17th day of December, A. D. one thousand nine hundred and twenty-two.

WILLIAM H. JOHNSON.